United States Patent
Uozumi et al.

(10) Patent No.: US 12,543,756 B2
(45) Date of Patent: Feb. 10, 2026

(54) OIL AND/OR FAT COMPOSITION AND FOOD OR BEVERAGE PRODUCT

(71) Applicant: MIYOSHI OIL & FAT CO., LTD., Tokyo (JP)

(72) Inventors: Keisuke Uozumi, Tokyo (JP); Yusuke Tomita, Tokyo (JP); Kimiko Saito, Tokyo (JP); Akira Ohta, Tokyo (JP); Masanori Shida, Tokyo (JP)

(73) Assignee: MIYOSHI OIL & FAT CO., LTD., Tokyo (JP)

( * ) Notice: Subject to any disclaimer, the term of this patent is extended or adjusted under 35 U.S.C. 154(b) by 0 days.

(21) Appl. No.: 17/999,187

(22) PCT Filed: Oct. 5, 2022

(86) PCT No.: PCT/JP2022/037326
§ 371 (c)(1),
(2) Date: Nov. 17, 2022

(87) PCT Pub. No.: WO2023/058695
PCT Pub. Date: Apr. 13, 2023

(65) Prior Publication Data
US 2024/0298662 A1 Sep. 12, 2024

(30) Foreign Application Priority Data
Oct. 7, 2021 (JP) .................. 2021-165551

(51) Int. Cl.
*A23D 9/007* (2006.01)
*A23L 27/26* (2016.01)

(52) U.S. Cl.
CPC ............. *A23D 9/007* (2013.01); *A23L 27/26* (2016.08)

(58) Field of Classification Search
CPC . A23V 2200/15; A23V 2200/16; A23L 27/88; A23L 27/84; A23L 27/26; A23L 27/204; A23D 9/007
USPC ....................................... 426/534, 650, 590
See application file for complete search history.

(56) References Cited

FOREIGN PATENT DOCUMENTS

| CN | 102551021 A | 7/2012 |
| JP | 2005-015683 A | 1/2005 |
| JP | 2005-143465 A | 6/2005 |
| JP | 2015211669 A | * 11/2015 |
| WO | WO-2013135511 A1 | * 9/2013 ............... A23L 2/56 |

OTHER PUBLICATIONS

JP 2015211669-A, Aso Yuishiro et al., English Machine Translation, Nov. 26, 2015, pp. 1-11 (Year: 2015).*
"Analysis of Volatile Compounds in Dictyophora indusiata-Fortified Beef Flavor by GC-MS and GC-O" Food Science •2016 • vol. 37, No. 2 • pp. 92-98, 2016.
"Analysis and Simulation of Volatile Components of Roasted Beef" Flavour Fragrance Cosmetics 丸 No. 5,○ pp. 43-47, Oct. 2010.
"Analysis of Aroma Components of Xinjiang Roasted Mutton Using GC-MS and GC-O", 2010.
Burdock, George A., "Fenaroli's Handbook of Flavor Ingredients", sixth edition, CRC Press, 2009, pp. 1392-1393.
Burdock, George A., "Fenaroli's Handbook of Flavor Ingredients", sixth edition, CRC Press, 2009, pp. 451-452.
Burdock, George A., "Fenaroli's Handbook of Flavor Ingredients", sixth edition, CRC Press, 2009, pp. 53-54.
Hsu, Chen-Ming, et al. "Characterization of new volatile compounds in the neutral fraction of roasted beef flavor." *Journal of Food Science* 47.6 (1982), pp. 2068-2069.
Japan Flavor and Fragrance Materials Association Homepage: Perfume course: Mixed perfume, 2009, https://us01.z.antigena.com/l/sUyi5KT3AdOLPAwlVpvllz5h7_OIYMnnnTYsWZuBU6iC1i5wQloQ7BNmPHQ_aWW2FW74wp2ky427PHByZZJqKJI8htaNSSNX3GQ2ztNbJ_xEITpRtM5AVfOdatS6GTcn8UdG-djCSjw1vyKnN5k_sjiEmd~jRY423PwnpMpWFdr.
Lustre, Alicia O. and Issenberg, Phillip, "Phenolic components of smoked meat products." *Journal of Agricultural and Food Chemistry* 18.6 (1970), pp. 1056-1060.

* cited by examiner

*Primary Examiner* — Hong T Yoo
(74) *Attorney, Agent, or Firm* — Knobbe, Martens, Olson & Bear, LLP

(57) ABSTRACT

An oil and/or fat composition having a good meaty flavor and a grilled flavor. The oil and/or fat composition includes an oil and/or fat, sulfurol, and 2,6-dimethoxyphenol.

19 Claims, No Drawings

OIL AND/OR FAT COMPOSITION AND FOOD OR BEVERAGE PRODUCT

CROSS-REFERENCE TO RELATED APPLICATIONS

This application is the U.S. National Phase under 35 U.S.C. § 371 of International Application PCT/JP2022/037325, filed Oct. 5, 2022, which claims priority to Japanese Patent Application No. 2021-165551, filed Oct. 7, 2021, the entire contents of which are incorporated herein by reference.

BACKGROUND OF THE INVENTION

Technical Field

The present invention relates to an oil and/or fat composition and to a food or beverage product.

Background Art

Seasoning oil is known as a seasoning for enhancing the palatability of various foods and beverages. Seasoning oil is also called flavored oil, and well-known examples include oils and fats that have been flavored as desired (e.g., green onion, garlic). Seasoning oil with a meaty flavor is also known.

For example, Patent Document 1 discloses heat cooking oil with a meaty flavor.

Patent Document 1: Japanese Unexamined Patent Application, Publication No. 2005-15683

DISCLOSURE OF THE INVENTION

Problems to be Solved by the Invention

Nevertheless, there is a need for seasoning oil with better flavor.

The inventors have found that a more palatable seasoning oil can be obtained by adding an enhanced grilled flavor to an oil and/or fat along with a meaty flavor.

The present invention has been made in light of the circumstances described above, and it is an object of the present invention to provide an oil and/or fat composition having a good meaty flavor and a grilled flavor.

Means for Solving the Problems

The inventors have completed the present invention based on findings that the problem described above can be solved by adding specific components to an oil and/or fat. More specifically, the present invention provides the following aspects.

(1) An oil and/or fat composition including: an oil and/or fat; sulfurol; and 2,6-dimethoxyphenol.
(2) The oil and/or fat composition according to aspect (1), further including 3-methylbutanal.
(3) The oil and/or fat composition according to aspect (1) or (2), further including 4-allyl-2,6-dimethoxyphenol.
(4) The oil and/or fat composition according to any one of aspects (1) to (3), further including eugenol.
(5) The oil and/or fat composition according to any one of aspects (1) to (4), further including 2-methoxy-4-vinylphenol.
(6) The oil and/or fat composition according to any one of aspects (1) to (5), further including δ-octalactone and/or δ-decalactone.
(7) A food or beverage product including the oil and/or fat composition according to any one of aspects (1) to (6).

Effects of the Invention

The present invention provides an oil and/or fat composition having a good meaty flavor and a grilled flavor.

PREFERRED MODE FOR CARRYING OUT THE INVENTION

Hereinafter, embodiments of the present invention will be described, which are not intended to limit the scope of the present invention.

<Oil and/or Fat Composition>

The oil and/or fat composition of the present invention includes at least an oil and/or fat, sulfurol, and 2,6-dimethoxyphenol. The form of the oil and/or fat composition of the present invention is not particularly limited, but can be a seasoning oil and/or fat (also referred to as flavored oil and/or fat), which is an oil and/or fat provided with flavor. Furthermore, the fat and/or oil composition of the present invention may be a seasoning.

As a result of investigation of various flavor components, the inventors have found that when added to an oil and/or fat, sulfurol can give a meaty flavor to it. The inventors have also found, however, that a meat-specific pleasant flavor cannot be provided only by adding an enhanced meaty flavor.

As a result of further investigations, the inventors have found that a meat-specific pleasant flavor can be easily reproduced using a grilled flavor in combination with a meaty flavor among various sensory factors. The inventors have finally found that when added together with sulfurol to an oil and/or fat, 2,6-dimethoxyphenol can provide an enhanced grilled flavor without degrading the meaty flavor caused by sulfurol.

Accordingly, the present invention makes it possible to provide a good meaty flavor and a grilled flavor without using any animal-derived ingredient (e.g., meat, meat-derived components, animal fat and/or oil, milk constituents, egg). However, the scope of the present invention should not be interpreted to exclude any oil and/or fat composition including an animal-derived ingredient.

As used herein, the term "meat" is intended to include all kinds of edible meat from livestock. Specific examples of meat include beef, pork, chicken, horse meat, sheep meat, and goat meat. The meat may be derived from any part of the animal, which may include not only a muscle part but also a fatty part.

As used herein, the term "meaty flavor" means a flavor reminiscent of meat (especially, cooked (heated) meat). Whether or how much such a flavor exists may be determined by the method shown in the EXAMPLES section.

As used herein, the term "grilled flavor" means a flavor reminiscent of charcoal-grilled meat. Whether or how much such a flavor exists may be determined by the method shown in the EXAMPLES section.

The present invention also makes it possible to provide a meat-specific "sweet flavor" in addition to the meaty flavor and the grilled flavor. As used herein, the term "sweet flavor" means a flavor reminiscent of fatty part of beef (especially, Wagyu beef) with "marbling" (fat between lean meat tissues). Whether or how much such a flavor exists may be determined by the method shown in the EXAMPLES section.

The present invention makes it easy to provide a flavor resembling that of beef (especially, cooked fatty beef).

Hereinafter, the oil and/or fat composition of the present invention will be described in detail.

(Sulfurol)

The oil and/or fat composition of the present invention includes sulfurol (chemical formula: $C_6H_9NOS$, CAS No. 137-00-8). Sulfurol is also called 4-methyl-5-thiazoleethanol.

In the present invention, sulfurol mainly contributes to enhancing meaty flavor.

The content of sulfurol in the oil and/or fat composition of the present invention may be adjusted according to the desired degree of flavor or other requirements. The content of sulfurol in the oil and/or fat composition of the present invention preferably has a lower limit of 10 ppm or more, more preferably 50 ppm or more, for ease of providing a sufficient level of meaty flavor. The content of sulfurol in the oil and/or fat composition of the present invention preferably has an upper limit of 10,000 ppm or less, more preferably 7,000 ppm or less, for prevention of unpleasant odors.

In the present invention, sulfurol may be a synthetic product, or a food or beverage product, an extract, or any other product which includes sulfurol as a component thereof may be used as a source of sulfurol.

The content of sulfurol in the oil and/or fat composition may be determined by the method described below, which is called the external standard method, using SPME (solid phase microextraction) for gas chromatography. First, sulfurol is diluted with MCT (medium chain triglyceride) to prepare four standard samples having sulfurol concentrations of 2.0 ppm, 200 ppm, 2,000 ppm, and 20,000 ppm. These samples are subjected to gas chromatography, and the area of the peak at an ion mass of 112 (molecular ion) is counted and used to plot a calibration curve. The retention time is also recorded. Next, the oil and/or fat composition to be analyzed is subjected to gas chromatography, and the area of the peak at an ion mass of 112 (molecular ion), which is at the same retention time as that of the standard sample, is counted. The resulting count is used to determine the content of sulfurol in the oil and/or fat composition from the calibration curve.

(2,6-Dimethoxyphenol)

The oil and/or fat composition of the present invention includes 2,6-dimethoxyphenol (chemical formula: $(CH_3O)_2C_6H_3OH$, CAS No. 91-10-1). 2,6-Dimethoxyphenol is also called pyrogallol 1,3-dimethyl ether.

In the present invention, 2,6-dimethoxyphenol is a component that provides an enhanced grilled flavor without degrading the meaty flavor caused by sulfurol.

The content of 2,6-dimethoxyphenol in the oil and/or fat composition of the present invention may be adjusted according to the desired degree of flavor or other requirements. The content of 2,6-dimethoxyphenol in the oil and/or fat composition of the present invention preferably has a lower limit of 20 ppm or more, more preferably 100 ppm or more, for ease of providing a sufficient level of grilled flavor. The content of 2,6-dimethoxyphenol in the oil and/or fat composition of the present invention preferably has an upper limit of 10,000 ppm or less, more preferably 7,000 ppm or less, for prevention of unpleasant odors.

In the present invention, 2,6-dimethoxyphenol may be a synthetic product, or a food or beverage product, an extract, or any other product may be used as a source of 2,6-dimethoxyphenol.

The content of 2,6-dimethoxyphenol in the oil and/or fat composition may be determined by the method described below, which is called the external standard method, using SPME (solid phase microextraction) for gas chromatography. First, 2,6-dimethoxyphenol is diluted with MCT (medium chain triglyceride) to prepare four standard samples having 2,6-dimethoxyphenol concentrations of 5.0 ppm, 500 ppm, 5,000 ppm, and 50,000 ppm. These samples are subjected to gas chromatography, and the area of the peak at an ion mass of 154 (molecular ion) is counted and used to plot a calibration curve. The retention time is also recorded. Next, the oil and/or fat composition to be analyzed is subjected to gas chromatography, and the area of the peak at an ion mass of 154 (molecular ion), which is at the same retention time as that of the standard sample, is counted. The resulting count is used to determine the content of 2,6-dimethoxyphenol in the oil and/or fat composition from the calibration curve.

(3-Methylbutanal)

The oil and/or fat composition of the present invention may further include 3-methylbutanal (chemical formula: $C_5H_{10}O$, CAS No. 590-86-3). 3-Methylbutanal is also called isovaleraldehyde.

When added to the oil and/or fat composition, 3-methylbutanal will provide it with an enhanced grilled flavor and an enhanced sweet flavor without degrading the meaty flavor caused by sulfurol and 2,6-dimethoxyphenol.

The content of 3-methylbutanal in the oil and/or fat composition of the present invention may be adjusted according to the desired degree of flavor or other requirements. The content of 3-methylbutanal in the oil and/or fat composition of the present invention preferably has a lower limit of 0.50 ppm or more, more preferably 3.0 ppm or more, for ease of providing an enhanced meaty flavor, an enhanced grilled flavor, and an enhanced sweet flavor. The content of 3-methylbutanal in the oil and/or fat composition of the present invention preferably has an upper limit of 1,500 ppm or less, more preferably 1,000 ppm or less, for prevention of degradation of the meaty flavor and the sweet flavor.

In the present invention, 3-methylbutanal may be a synthetic product, or a food or beverage product, an extract, or any other product may be used as a source of 3-methylbutanal.

The content of 3-methylbutanal in the oil and/or fat composition may be determined by the method described below, which is called the external standard method, using SPME (solid phase microextraction) for gas chromatography. First, 3-methylbutanal is diluted with MCT (medium chain triglyceride) to prepare four standard samples having 3-methylbutanal concentrations of 0.20 ppm, 20 ppm, 200 ppm, and 2,000 ppm. These samples are subjected to gas chromatography, and the area of the peak at an ion mass of 44 (molecular ion) is counted and used to plot a calibration curve. The retention time is also recorded. Next, the oil and/or fat composition to be analyzed is subjected to gas chromatography, and the area of the peak at an ion mass of 44 (molecular ion), which is at the same retention time as that of the standard sample, is counted. The resulting count is used to determine the content of 3-methylbutanal in the oil and/or fat composition from the calibration curve.

4-Allyl-2,6-Dimethoxyphenol

The oil and/or fat composition of the present invention may further include 4-allyl-2,6-dimethoxyphenol (chemical formula: $H_2C=CHCH_2C_6H_2(OCH_3)_2OH$, CAS No. 6627-88-9). 4-Allyl-2,6-dimethoxyphenol is also called methoxyeugenol.

When added to the oil and/or fat composition, 4-allyl-2,6-dimethoxyphenol will provide it with an enhanced sweet flavor while enhancing the meaty flavor caused by sulfurol and 2,6-dimethoxyphenol.

The content of 4-allyl-2,6-dimethoxyphenol in the oil and/or fat composition of the present invention may be adjusted according to the desired degree of flavor or other requirements. The content of 4-allyl-2,6-dimethoxyphenol in the oil and/or fat composition of the present invention preferably has a lower limit of 5.0 ppm or more, more preferably 10 ppm or more, even more preferably 30 ppm or more, for ease of providing an enhanced meaty flavor and an enhanced sweet flavor. The content of 4-allyl-2,6-dimethoxyphenol in the oil and/or fat composition of the present invention preferably has an upper limit of 15,000 ppm or less, more preferably 10,000 ppm or less, for prevention of degradation of the grilled flavor and the sweet flavor.

In the present invention, 4-allyl-2,6-dimethoxyphenol may be a synthetic product, or a food or beverage product, an extract, or any other product may be used as a source of 4-allyl-2,6-dimethoxyphenol.

The content of 4-allyl-2,6-dimethoxyphenol in the oil and/or fat composition may be determined by the method described below, which is called the external standard method, using SPME (solid phase microextraction) for gas chromatography. First, 4-allyl-2,6-dimethoxyphenol is diluted with MCT (medium chain triglyceride) to prepare four standard samples having 4-allyl-2,6-dimethoxyphenol concentrations of 3.0 ppm, 300 ppm, 3,000 ppm, and 30,000 ppm. These samples are subjected to gas chromatography, and the area of the peak at an ion mass of 194 (molecular ion) is counted and used to plot a calibration curve. The retention time is also recorded. Next, the oil and/or fat composition to be analyzed is subjected to gas chromatography, and the area of the peak at an ion mass of 194 (molecular ion), which is at the same retention time as that of the standard sample, is counted. The resulting count is used to determine the content of 4-allyl-2,6-dimethoxyphenol in the oil and/or fat composition from the calibration curve.

(Eugenol)

The oil and/or fat composition of the present invention may further include eugenol (chemical formula: $C_{10}H_{12}O_2$, CAS No. 97-53-0). Eugenol is also called 4-allyl-2-methoxyphenol.

When added to the oil and/or fat composition, eugenol will provide it with a further enhanced meaty flavor without degrading the grilled flavor caused by sulfurol and 2,6-dimethoxyphenol.

The content of eugenol in the oil and/or fat composition of the present invention may be adjusted according to the desired degree of flavor or other requirements. The content of eugenol in the oil and/or fat composition of the present invention preferably has a lower limit of 1.0 ppm or more, more preferably 5.0 ppm or more, even more preferably 15 ppm or more, for ease of providing an enhanced meaty flavor. The content of eugenol in the oil and/or fat composition of the present invention preferably has an upper limit of 6,000 ppm or less, more preferably 5,000 ppm or less, for prevention of degradation of the meaty flavor and the sweet flavor.

In the present invention, eugenol may be a synthetic product, or a food or beverage product, an extract, or any other product may be used as a source of eugenol.

The content of eugenol in the oil and/or fat composition may be determined by the method described below, which is called the external standard method, using SPME (solid phase microextraction) for gas chromatography. First, eugenol is diluted with MCT (medium chain triglyceride) to prepare four standard samples having eugenol concentrations of 2.0 ppm, 200 ppm, 2,000 ppm, and 20,000 ppm. These samples are subjected to gas chromatography, and the area of the peak at an ion mass of 164 (molecular ion) is counted and used to plot a calibration curve. The retention time is also recorded. Next, the oil and/or fat composition to be analyzed is subjected to gas chromatography, and the area of the peak at an ion mass of 164 (molecular ion), which is at the same retention time as that of the standard sample, is counted. The resulting count is used to determine the content of eugenol in the oil and/or fat composition from the calibration curve.

2-Methoxy-4-Vinylphenol

The oil and/or fat composition of the present invention may further include 2-methoxy-4-vinylphenol (chemical formula: $C_9H_{10}O$, CAS No. 7786-61-0). 2-Methoxy-4-vinylphenol is also called 4-vinylguaiacol.

When added to the oil and/or fat composition, 2-methoxy-4-vinylphenol will further enhance the meaty flavor and the grilled flavor, which are caused by sulfurol and 2,6-dimethoxyphenol.

The content of 2-methoxy-4-vinylphenol in the oil and/or fat composition of the present invention may be adjusted according to the desired degree of flavor or other requirements. The content of 2-methoxy-4-vinylphenol in the oil and/or fat composition of the present invention preferably has a lower limit of 10 ppm or more, more preferably 30 ppm or more, even more preferably 50 ppm or more, for ease of enhancing the meaty flavor and the grilled flavor. The content of 2-methoxy-4-vinylphenol in the oil and/or fat composition of the present invention preferably has an upper limit of 20,000 ppm or less, more preferably 18,000 ppm or less, for prevention of degradation of the meaty flavor and the sweet flavor.

In the present invention, 2-methoxy-4-vinylphenol may be a synthetic product, or a food or beverage product, an extract, or any other product may be used as a source of 2-methoxy-4-vinylphenol.

The content of 2-methoxy-4-vinylphenol in the oil and/or fat composition may be determined by the method described below, which is called the external standard method, using SPME (solid phase microextraction) for gas chromatography. First, 2-methoxy-4-vinylphenol is diluted with MCT (medium chain triglyceride) to prepare four standard samples having 2-methoxy-4-vinylphenol concentrations of 5.0 ppm, 500 ppm, 5,000 ppm, and 50,000 ppm. These samples are subjected to gas chromatography, and the area of the peak at an ion mass of 150 (molecular ion) is counted and used to plot a calibration curve. The retention time is also recorded. Next, the oil and/or fat composition to be analyzed is subjected to gas chromatography, and the area of the peak at an ion mass of 150 (molecular ion), which is at the same retention time as that of the standard sample, is counted. The resulting count is used to determine the content of 2-methoxy-4-vinylphenol in the oil and/or fat composition from the calibration curve.

(δ-Octalactone and δ-Decalactone)

The oil and/or fat composition of the present invention may further include one or both of δ-octalactone (chemical formula: $C_8H_{14}O_2$, CAS No. 698-76-0) and δ-decalactone (chemical formula: $C_{10}H_{18}O_2$, CAS No. 705-86-2). δ-Octalactone is also called 6-propyltetrahydro-2H-pyran-2-one. δ-Decalactone is also called 6-pentyltetrahydro-2H-pyran-2-one.

When added to the oil and/or fat composition, δ-octalactone and/or δ-decalactone will further enhance the meaty flavor, which is caused by sulfurol and 2,6-dimethoxyphenol, and the sweet flavor.

The content of δ-octalactone in the oil and/or fat composition of the present invention may be adjusted according to the desired degree of flavor or other requirements. The content of δ-octalactone in the oil and/or fat composition of the present invention preferably has a lower limit of 0.050 ppm or more, more preferably 0.10 ppm or more, even more preferably 0.50 ppm or more, for ease of enhancing the meaty flavor and the sweet flavor. The content of δ-octalactone in the oil and/or fat composition of the present invention preferably has an upper limit of 200 ppm or less, more preferably 150 ppm or less, even more preferably 20 ppm or less, for prevention of degradation of the meaty flavor and the grilled flavor.

The content of δ-decalactone in the oil and/or fat composition of the present invention may be adjusted according to the desired degree of flavor or other requirements. The content of δ-decalactone in the oil and/or fat composition of the present invention preferably has a lower limit of 0.10 ppm or more, more preferably 0.50 ppm or more, even more preferably 2.0 ppm or more, for ease of enhancing the meaty flavor, the grilled flavor, and the sweet flavor. The content of δ-decalactone in the oil and/or fat composition of the present invention preferably has an upper limit of 600 ppm or less, more preferably 500 ppm or less, even more preferably 60 ppm or less, for prevention of degradation of the meaty flavor and the grilled flavor.

In the present invention, δ-octalactone or δ-decalactone may be a synthetic product, or a food or beverage product, an extract, or any other product may be used as a source of one or both of them.

The content of δ-octalactone in the oil and/or fat composition may be determined by the method described below, which is called the external standard method, using SPME (solid phase microextraction) for gas chromatography. First, δ-octalactone is diluted with MCT (medium chain triglyceride) to prepare four standard samples having δ-octalactone concentrations of 0.050 ppm, 5.0 ppm, 50 ppm, and 500 ppm. These samples are subjected to gas chromatography, and the area of the peak at an ion mass of 99 (molecular ion) is counted and used to plot a calibration curve. The retention time is also recorded. Next, the oil and/or fat composition to be analyzed is subjected to gas chromatography, and the area of the peak at an ion mass of 99 (molecular ion), which is at the same retention time as that of the standard sample, is counted. The resulting count is used to determine the content of δ-octalactone in the oil and/or fat composition from the calibration curve.

The content of δ-decalactone in the oil and/or fat composition may be determined by the method described below, which is called the external standard method, using SPME (solid phase microextraction) for gas chromatography. First, δ-decalactone is diluted with MCT (medium chain triglyceride) to prepare four standard samples having δ-decalactone concentrations of 0.10 ppm, 10 ppm, 100 ppm, and 1,000 ppm. These samples are subjected to gas chromatography, and the area of the peak at an ion mass of 99 (molecular ion) is counted and used to plot a calibration curve. The retention time is also recorded. Next, the oil and/or fat composition to be analyzed is subjected to gas chromatography, and the area of the peak at an ion mass of 99 (molecular ion), which is at the same retention time as that of the standard sample, is counted. The resulting count is used to determine the content of δ-decalactone in the oil and/or fat composition from the calibration curve.

(Proportion of Each Flavor Component)

The oil and/or fat composition of the present invention may be any composition including an oil and/or fat, sulfurol, and 2,6-dimethoxyphenol. Besides the above components, the oil and/or fat composition of the present invention preferably further includes one or more, more preferably two or more, even more preferably three or more, furthermore preferably four or more, still more preferably five or more, most preferably all components selected from the group consisting of 3-methylbutanal, 4-allyl-2,6-dimethoxyphenol, eugenol, 2-methoxy-4-vinylphenol, δ-octalactone, and δ-decalactone, for further ease of achieving the advantageous effects of the present invention.

The proportion of each component in the oil and/or fat composition of the present invention may satisfy any one or more or all of the conditions shown below.

For ease of achieving the advantageous effects of the present invention, the mass ratio (2,6-dimethoxyphenol/sulfurol) of the 2,6-dimethoxyphenol content to the sulfurol content preferably has a lower limit of 0.10 or more, more preferably 0.20 or more. For ease of achieving the advantageous effects of the present invention, the mass ratio (2,6-dimethoxyphenol/sulfurol) of the 2,6-dimethoxyphenol content to the sulfurol content preferably has an upper limit of 10 or less, more preferably 8.0 or less.

For ease of achieving the advantageous effects of the present invention, the mass ratio (3-methylbutanal/sulfurol) of the 3-methylbutanal content to the sulfurol content preferably has a lower limit of 0.00050 or more, more preferably 0.0050 or more. For ease of achieving the advantageous effects of the present invention, the mass ratio (3-methylbutanal/sulfurol) of the 3-methylbutanal content to the sulfurol content preferably has an upper limit of 0.50 or less, more preferably 0.40 or less.

For ease of achieving the advantageous effects of the present invention, the mass ratio (4-allyl-2,6-dimethoxyphenol/sulfurol) of the 4-allyl-2,6-dimethoxyphenol content to the sulfurol content preferably has a lower limit of 0.0050 or more, more preferably 0.050 or more. For ease of achieving the advantageous effects of the present invention, the mass ratio (4-allyl-2,6-dimethoxyphenol/sulfurol) of the 4-allyl-2,6-dimethoxyphenol content to the sulfurol content preferably has an upper limit of 5.0 or less, more preferably 4.0 or less.

For ease of achieving the advantageous effects of the present invention, the mass ratio (eugenol/sulfurol) of the eugenol content to the sulfurol content preferably has a lower limit of 0.0030 or more, more preferably 0.030 or more. For ease of achieving the advantageous effects of the present invention, the mass ratio (eugenol/sulfurol) of the eugenol content to the sulfurol content preferably has an upper limit of 3.0 or less, more preferably 2.0 or less.

For ease of achieving the advantageous effects of the present invention, the mass ratio (2-methoxy-4-vinylphenol/sulfurol) of the 2-methoxy-4-vinylphenol content to the sulfurol content preferably has a lower limit of 0.0050 or more, more preferably 0.050 or more. For ease of achieving the advantageous effects of the present invention, the mass ratio (2-methoxy-4-vinylphenol/sulfurol) of the 2-methoxy-4-vinylphenol content to the sulfurol content preferably has an upper limit of 8.0 or less, more preferably 7.0 or less.

For ease of achieving the advantageous effects of the present invention, the mass ratio (δ-octalactone/sulfurol) of the δ-octalactone content to the sulfurol content preferably has a lower limit of 0.00010 or more, more preferably 0.00050 or more. For ease of achieving the advantageous effects of the present invention, the mass ratio (δ-octalactone/sulfurol) of the δ-octalactone content to the sulfurol content preferably has an upper limit of 0.080 or less, more preferably 0.070 or less.

For ease of achieving the advantageous effects of the present invention, the mass ratio (δ-decalactone/sulfurol) of the δ-decalactone content to the sulfurol content preferably has a lower limit of 0.00030 or more, more preferably 0.0030 or more. For ease of achieving the advantageous effects of the present invention, the mass ratio (δ-decalactone/sulfurol) of the δ-decalactone content to the sulfurol content preferably has an upper limit of 0.30 or less, more preferably 0.20 or less.

For ease of achieving the advantageous effects of the present invention, the mass ratio ((δ-octalactone+δ-decalactone)/sulfurol) of the total content of δ-octalactone and δ-decalactone to the sulfurol content preferably has a lower limit of 0.00050 or more, more preferably 0.0050 or more. For ease of achieving the advantageous effects of the present invention, the mass ratio ((δ-octalactone+δ-decalactone)/sulfurol) of the total content of δ-octalactone and δ-decalactone to the sulfurol content preferably has an upper limit of 0.50 or less, more preferably 0.20 or less, even more preferably 0.050 or less.

For ease of achieving the advantageous effects of the present invention, the mass ratio (3-methylbutanal/2,6-dimethoxyphenol) of the 3-methylbutanal content to the 2,6-dimethoxyphenol content preferably has a lower limit of 0.00030 or more, more preferably 0.0030 or more. For ease of achieving the advantageous effects of the present invention, the mass ratio (3-methylbutanal/2,6-dimethoxyphenol) of the 3-methylbutanal content to the 2,6-dimethoxyphenol content preferably has an upper limit of 0.30 or less, more preferably 0.20 or less.

For ease of achieving the advantageous effects of the present invention, the mass ratio (4-allyl-2,6-dimethoxyphenol/2,6-dimethoxyphenol) of the 4-allyl-2,6-dimethoxyphenol content to the 2,6-dimethoxyphenol content preferably has a lower limit of 0.0030 or more, more preferably 0.030 or more. For ease of achieving the advantageous effects of the present invention, the mass ratio (4-allyl-2,6-dimethoxyphenol/2,6-dimethoxyphenol) of the 4-allyl-2,6-dimethoxyphenol content to the 2,6-dimethoxyphenol content preferably has an upper limit of 3.0 or less, more preferably 2.0 or less.

For ease of achieving the advantageous effects of the present invention, the mass ratio (eugenol/2,6-dimethoxyphenol) of the eugenol content to the 2,6-dimethoxyphenol content preferably has a lower limit of 0.0010 or more, more preferably 0.010 or more. For ease of achieving the advantageous effects of the present invention, the mass ratio (eugenol/2,6-dimethoxyphenol) of the eugenol content to the 2,6-dimethoxyphenol content preferably has an upper limit of 1.5 or less, more preferably 1.0 or less.

For ease of achieving the advantageous effects of the present invention, the mass ratio (2-methoxy-4-vinylphenol/2,6-dimethoxyphenol) of the 2-methoxy-4-vinylphenol content to the 2,6-dimethoxyphenol content preferably has a lower limit of 0.0050 or more, more preferably 0.050 or more. For ease of achieving the advantageous effects of the present invention, the mass ratio (2-methoxy-4-vinylphenol/2,6-dimethoxyphenol) of the 2-methoxy-4-vinylphenol content to the 2,6-dimethoxyphenol content preferably has an upper limit of 4.0 or less, more preferably 3.0 or less.

For ease of achieving the advantageous effects of the present invention, the mass ratio (δ-octalactone/2,6-dimethoxyphenol) of the δ-octalactone content to the 2,6-dimethoxyphenol content preferably has a lower limit of 0.000050 or more, more preferably 0.00050 or more. For ease of achieving the advantageous effects of the present invention, the mass ratio (δ-octalactone/2,6-dimethoxyphenol) of the δ-octalactone content to the 2,6-dimethoxyphenol content preferably has an upper limit of 0.040 or less, more preferably 0.030 or less.

For ease of achieving the advantageous effects of the present invention, the mass ratio (δ-decalactone/2,6-dimethoxyphenol) of the δ-decalactone content to the 2,6-dimethoxyphenol content preferably has a lower limit of 0.00010 or more, more preferably 0.0010 or more. For ease of achieving the advantageous effects of the present invention, the mass ratio (δ-decalactone/2,6-dimethoxyphenol) of the δ-decalactone content to the 2,6-dimethoxyphenol content preferably has an upper limit of 0.15 or less, more preferably 0.10 or less.

For ease of achieving the advantageous effects of the present invention, the mass ratio ((δ-octalactone+δ-decalactone)/2,6-dimethoxyphenol) of the total content of δ-octalactone and δ-decalactone to the 2,6-dimethoxyphenol content preferably has a lower limit of 0.00010 or more, more preferably 0.0010 or more. For ease of achieving the advantageous effects of the present invention, the mass ratio ((δ-octalactone+δ-decalactone)/2,6-dimethoxyphenol) of the total content of δ-octalactone and δ-decalactone to the 2,6-dimethoxyphenol content preferably has an upper limit of 0.20 or less, more preferably 0.10 or less, even more preferably 0.050 or less.

(Oil and/or Fat)

Edible oil and/or fat is usually used as the oil and/or fat. Examples of the edible oil and/or fat include vegetable oil and/or fat, animal oil and/or fat, synthetic oil and/or fat, and processed oil and/or fat. They may be used singly, or two or more of them may be used in the form of an oil and/or fat mixture.

As mentioned above, the present invention makes it possible to provide a good meaty flavor and a grilled flavor even without using any animal-derived ingredient. In other words, the present invention makes it possible to provide a good meaty flavor and a grilled flavor even in a case where the oil and/or fat includes only non-animal oil and/or fat (preferably only vegetable oil and/or fat and/or processed vegetable oil and/or fat).

Examples of the vegetable oil and/or fat include rapeseed oil (canola oil), soybean oil, corn oil, sesame oil, shiso oil, linseed oil, peanut oil, safflower oil, high oleic safflower oil, sunflower oil, high oleic sunflower oil, cottonseed oil, grape seed oil, macadamia nut oil, hazelnut oil, pumpkin seed oil, walnut oil, camellia oil, tea seed oil, perilla oil, borage oil, olive oil, rice bran oil, wheat germ oil, coconut oil, cocoa fat, palm oil, palm kernel oil, and algae oil.

Examples of the animal oil and/or fat include fish oil (oil and/or fat derived from tuna, mackerel, sardine, bonito, herring, or other fish), pork fat, beef fat, milkfat, and sheep fat.

Examples of the synthetic oil and/or fat include medium chain triglyceride oil and diacylglycerol.

The processed oil and/or fat may be any one of the above oils and/or fats having undergone a desired process. Examples of such a process include fractionation (e.g., for producing fractionated oil and/or fat, such as fractionated low-melting-point milkfat or palm super olein), hardening, and transesterification reaction. The oil and/or fat may have undergone one or more processes.

(Other Components)

The oil and/or fat composition of the present invention may contain any food material or additive that is known for use in food or beverage products to the extent that it does not interfere with the advantageous effects of the present invention. Examples of the food material include saccharides, tea leaves, vegetables, fruits, spices, yeast, yeast extracts, flavored edible oils (e.g., green onion oil, hot sesame oil, Chinese pepper oil, onion oil, garlic oil, ginger oil, mushroom oil, porcini mushroom oil, truffle oil, bamboo shoot oil, horseradish oil, Yuzu oil, roasted soy sauce oil), virgin coconut oil, virgin olive oil, virgin corn oil, and smoked oil. Examples of the food additive include emulsifiers, antioxidants, silicones, colorants, flavors, vitamins, and pH adjusting agents.

The type and amount of the food material or additive may be selected as appropriate depending on the desired effect. The food material or additive may be used in combination with the oil and/or fat composition of the present invention to produce, for example, a flavor- or color-adjusting effect, an oxidation- or degradation-preventing effect, a function-enhancing effect, or any other advantageous effect.

As mentioned above, the present invention makes it possible to provide a good meaty flavor and a grilled flavor even without using any animal-derived ingredient. In other words, the present invention makes it possible to provide a good meaty flavor and a grilled flavor even without using any animal-derived food material (e.g., meat) or any animal-derived food additive (e.g., meat-derived components such as animal extracts).

For ease of achieving the advantageous effects of the present invention, the oil and/or fat composition of the present invention preferably contains substantially or completely no moisture. As used herein, the expression "the oil and/or fat composition contains substantially no moisture" means that the water content of the oil and/or fat composition is at most 0.5% by mass based on the total mass of the oil and/or fat composition. As used herein, the expression "the oil and/or fat composition contains completely no moisture" means that the water content of the oil and/or fat composition is 0.0% by mass based on the total mass of the oil and/or fat composition. As used herein, the term "moisture" means water ($H_2O$). The water content of the oil and/or fat composition of the present invention may be measured according to The JOCS Standard Methods for the Analysis of Fats, Oils and Related Materials 2.1.3.4-2013 Moisture (Karl Fischer Method).

For ease of achieving the advantageous effects of the present invention, the oil and/or fat composition of the present invention may consist of an oil and/or fat and the two components: sulfurol and 2,6-dimethoxyphenol, which are described above, and may contain no other components.

<Method for Producing the Oil and/or Fat Composition>

The oil and/or fat composition of the present invention may be produced by appropriately mixing and stirring the components using a stirrer or other stirring means. The components may be mixed in any order and in any way.

As mentioned above, the flavor components: sulfurol, 2,6-dimethoxyphenol, 3-methylbutanal, 4-allyl-2,6-dimethoxyphenol, eugenol, 2-methoxy-4-vinylphenol, δ-octalactone, and δ-decalactone can be added to the oil and/or fat composition as synthetic products or as food or beverage products or extracts that contain each component as a part thereof. The synthetic products may be commercially available reagents or flavors.

A food material and/or a food additive containing some or all of the flavor components mentioned above may also be used. Examples of such a food material and/or such a food additive include meat, saccharides, tea leaves, vegetables (e.g., green onion, onion, celery, carrot), fruits (e.g., banana, lemon, melon, strawberry, coconut), soy sauce, miso, spices (e.g., anise, allspice, caraway, cumin, clove, coriander, cinnamon, star anise, sage, thyme, nutmeg, basil, paprika, pimento, pink pepper, black pepper, white pepper, mace, lemongrass, rose hip, rosemary, laurel), flavored edible oils (e.g., green onion oil, hot sesame oil, Chinese pepper oil, onion oil, garlic oil, ginger oil, mushroom oil, porcini mushroom oil, truffle oil, bamboo shoot oil, horseradish oil, Yuzu oil, roasted soy sauce oil), virgin coconut oil, virgin olive oil, virgin corn oil, smoked liquid, smoked oil, protein hydrolysates, peptides, amino acids, nucleic acids, vitamins, minerals, and any combination thereof. The food material may be used directly without being processed or may be used after being processed (e.g., heated). For example, the food material may be immersed in an oil and/or fat, which may be followed by heating, filtration, and other steps, so that the oil and/or fat composition of the present invention is obtained.

<Uses of the Oil and/or Fat Composition>

The oil and/or fat composition of the present invention may be used for any purpose, such as an alternative to seasoning oil known in the art, or may be used in combination with any seasoning (e.g., seasoning oil known in the art).

The oil and/or fat composition of the present invention may be added to any food or beverage product to give a good meaty flavor and a grilled flavor to the food or beverage product. Therefore, the present invention also encompasses food and beverage products containing the oil and/or fat composition of the present invention and preferably encompasses meat alternative food products containing the oil and/or fat composition of the present invention.

Examples of the food and beverage products, to which the oil and/or fat composition of the present invention may be added, include, but are not limited to, various prepared foods (e.g., fried foods), confections, breads, soups, sauces, and other food products prepared with oil and/or fat. The oil and/or fat composition of the present invention may be directly added to a food or beverage product. Alternatively, the oil and/or fat composition of the present invention may be added to any type of oil and/or fat products, such as frying oil, margarine, fat spread, shortening, edible oil and/or fat, flavored edible oil, oil-in-water emulsion product (e.g., concentrated milk, whipping cream, or mayonnaise), powdered oil and/or fat, or dressing, and those products may be used as a raw material for food or beverage products.

As mentioned above, the present invention makes it possible to provide a good meaty flavor and a grilled flavor without using any animal-derived ingredient. For example, therefore, the present invention makes it possible to give a good meaty flavor and a grilled flavor to meat alternative food products. The present invention also makes it possible to give a good sweet flavor to meat alternative food products and to mask material-specific odors (e.g., beany flavor in soybeans).

As used herein, the term "meat alternative food product" is intended to include any food products produced using a vegetable raw material, such as beans (e.g., soybeans, peas, chickpeas, horse beans), rice, or grains, as a main raw material. For ease of achieving the advantageous effects of the present invention, the meat alternative food product according to the present invention is preferably free of any animal-derived ingredient (e.g., meat, meat-derived components, animal oil and/or fat, milk constituents, egg).

Examples of the meat alternative food product include tofu hamburger patty, soy protein processed foods (e.g., hamburger patty-like foods, Shumai (Shao-mai)-like foods, dumpling (jiao-zi)-like foods, Chinese bun-like foods), and pea protein processed foods (e.g., hamburger patty-like foods, Shumai (Shao-mai)-like foods, dumpling (jiao-zi)-like foods, Chinese bun-like foods).

The content of the oil and/or fat composition of the present invention in the meat alternative food product may be adjusted as appropriate according to the desired flavor or other requirements. The content of the oil and/or fat composition of the present invention in the meat alternative food product preferably has a lower limit of 0.50% by mass or more, more preferably 1.0% by mass or more, based on the total mass of the meat alternative food materials. The content of the oil and/or fat composition of the present invention in the meat alternative food product preferably has an upper limit of 90% by mass or less, more preferably 80% by mass or less, based on the total mass of the meat alternative food materials.

EXAMPLES

Hereinafter, the present invention will be described in more detail with reference to examples, which are not intended to limit the scope of the present invention.

<Experiment 1: Preparation and Evaluation of Oil and/or Fat Compositions>

The methods described below were used to prepare oil and/or fat compositions and to evaluate their flavors.

(Preparation of Oil and/or Fat Compositions)

The oil and/or fat compositions of Example 1 to 42 and Comparative Examples 1 to 18 were prepared by mixing and stirring each component to the oil and/or fat shown in the "Oil and/or fat" column of Tables 1 to 5 to achieve the concentrations (in units of ppm) shown in the "Content in oil and/or fat composition" column.

In Tables 1 to 5, the term "mass ratio to sulfurol" refers to the mass ratio (each component/sulfurol) of the content of each component other than sulfurol to the content of sulfurol in each composition. The term "mass ratio to 2,6-dimethoxyphenol" refers to the mass ratio (each component/2,6-dimethoxyphenol) of the content of each component other than 2,6-dimethoxyphenol to the content of 2,6-dimethoxyphenol in each composition.

(Evaluation of Oil and/or Fat Compositions)

Each of the resulting oil and/or fat compositions was subjected to a sensory evaluation for each of meaty flavor, grilled flavor, and sweet flavor as shown below. The results are shown in the "Evaluation" column of Tables 1 to 5.

The sensory evaluation was carried out by panelists who were selected as described below. Panelist candidates took a five-taste identification test (sweet, sour, salty, bitter, and umami), a taste intensity discrimination test, a food taste discrimination test, and a standard odor identification test. As a result, 20 panelists were selected, who passed all of the tests. Before conducting the sensory evaluation, all the panelists conducted a discussion to reconcile the characteristics of each evaluation item and ensure that each panelist has a common understanding. In order to prevent the panelists from making biased evaluations and to allow them to make accurate evaluations in the sensory evaluations, the panelists were not informed of what samples were tested or how the test samples were numbered, and the samples were presented at random to the panelists.

[Sensory Evaluation]

A control sample of oil/fat composition was prepared by trimming a fatty part from Kobe beef ribeye, pan-frying the fatty part over low heat for 20 minutes, and collecting the melted and separated oil and fat. Each of the panelists ate the control oil/fat composition and memorized each of its flavors (meaty, grilled, and sweet flavors). Subsequently, each panelist ate each of the oil and/or fat compositions of the examples and the comparative examples and rated each of the flavors on a scale of 1 to 10, where "10" was the score for each flavor of the "control" oil/fat composition. A score closer to 10 indicates that the composition is better in each of the meaty, grilled, and sweet flavors. In the present examples, each of the flavors was evaluated to be good when rated at least 3. The average of the scores given by the panelists was calculated and rounded to the nearest integer.

TABLE 1

| | | Example | | | | | | |
|---|---|---|---|---|---|---|---|---|
| | | 1 | 2 | 3 | 4 | 5 | 6 | 7 |
| Oil and/or fat | Rapeseed oil | 100 | 100 | 100 | 100 | 100 | 100 | 200 |
| Content in oil and/or fat composition (ppm) | Sulfurol | 750 | 1500 | 2500 | 635 | 125 | 42 | 14 |
| | 2,6-Dimethoxyphenol | 6750 | 6000 | 5000 | 1250 | 250 | 84 | 26 |
| | 3-Methylbutanal | 0 | 0 | 0 | 0 | 0 | 0 | 0 |
| | 4-Allyl-2,6-dimethoxyphenol | 0 | 0 | 0 | 0 | 0 | 0 | 0 |
| | Eugenol | 0 | 0 | 0 | 0 | 0 | 0 | 0 |
| | 2-Methoxy-4-vinylphenol | 0 | 0 | 0 | 0 | 0 | 0 | 0 |
| | 5-Octalactone | 0 | 0 | 0 | 0 | 0 | 0 | 0 |
| | 5-Decalactone | 0 | 0 | 0 | 0 | 0 | 0 | 0 |
| Mass ratio to sulfurol | 2,6-Dimethoxyphenol | 9.0 | 4.0 | 2.0 | 2.0 | 7.0 | 2.0 | 2.0 |
| | 3-Methylbutanal | 0 | 0 | 0 | 0 | 0 | 0 | 0 |
| | 4-Allyl-2,6-dimethoxyphenol | 0 | 0 | 0 | 0 | 0 | 0 | 0 |
| | Eugenol | 0 | 0 | 0 | 0 | 0 | 0 | 0 |
| | 2-Methoxy-4-vinylphenol | 0 | 0 | 0 | 0 | 0 | 0 | 0 |
| | 5-Octelactone | 0 | 0 | 0 | 0 | 0 | 0 | 0 |
| | 5-Decalactone | 0 | 0 | 0 | 0 | 0 | 0 | 0 |

TABLE 1-continued

|  |  |  |  |  |  |  |  |  |
|---|---|---|---|---|---|---|---|---|
|  | 5-Octalactone + 5-accelactone | 0 | 0 | 0 | 0 | 0 | 0 | 0 |
| Mass ratio to 2,6-dimethoxyphenol | 3-Methylbutanal | 0 | 0 | 0 | 0 | 0 | 0 | 0 |
|  | 4-Allyl-2,6-dimethoxyphenol | 0 | 0 | 0 | 0 | 0 | 0 | 0 |
|  | Eugenol | 0 | 0 | 0 | 0 | 0 | 0 | 0 |
|  | 2-Methoxy-4-vinylphenol | 0 | 0 | 0 | 0 | 0 | 0 | 0 |
|  | 5-Octalactone | 0 | 0 | 0 | 0 | 0 | 0 | 0 |
|  | 5-Decalactone | 0 | 0 | 0 | 0 | 0 | 0 | 0 |
|  | 5-Octalactone + 5-decalactone | 0 | 0 | 0 | 0 | 0 | 0 | 0 |
| Evaluation | Meaty flavor | 3 | 4 | 4 | 4 | 4 | 3 | 3 |
|  | Grilled flavor | 5 | 4 | 4 | 4 | 4 | 3 | 3 |
|  | Sweet flavor | 2 | 2 | 2 | 2 | 7 | 2 | 2 |

|  |  | Example | | | | |
|---|---|---|---|---|---|---|
|  |  | 8 | 9 | 10 | 11 | 12 |
| Oil and/or fat Content in oil and/or fat composition (ppm) | Rapeseed oil | 100 | 100 | 100 | 100 | 100 |
|  | Sulfurol | 3750 | 5000 | 6000 | 6750 | 2500 |
|  | 2,6-Dimethoxyphenol | 3750 | 2500 | 1500 | 750 | 5000 |
|  | 3-Methylbutanal | 0 | 0 | 0 | 0 | 2.3 |
|  | 4-Allyl-2,6-dimethoxyphenol | 0 | 0 | 0 | 0 | 0 |
|  | Eugenol | 0 | 0 | 0 | 0 | 0 |
|  | 2-Methoxy-4-vinylphenol | 0 | 0 | 0 | 0 | 0 |
|  | 5-Octalactone | 0 | 0 | 0 | 0 | 0 |
|  | 5-Decalactone | 0 | 0 | 0 | 0 | 0 |
| Mass ratio to sulfurol | 2,6-Dimethoxyphenol | 1.0 | 0.50 | 0.25 | 0.11 | 2.0 |
|  | 3-Methylbutanal | 0 | 0 | 0 | 0 | 0.00092 |
|  | 4-Allyl-2,6-dimethoxyphenol | 0 | 0 | 0 | 0 | 0 |
|  | Eugenol | 0 | 0 | 0 | 0 | 0 |
|  | 2-Methoxy-4-vinylphenol | 0 | 0 | 0 | 0 | 0 |
|  | 5-Octelactone | 0 | 0 | 0 | 0 | 0 |
|  | 5-Decalactone | 0 | 0 | 0 | 0 | 0 |
|  | 5-Octalactone + 5-accelactone | 0 | 0 | 0 | 0 | 0 |
| Mass ratio to 2,6-dimethoxyphenol | 3-Methylbutanal | 0 | 0 | 0 | 0 | 0.00046 |
|  | 4-Allyl-2,6-dimethoxyphenol | 0 | 0 | 0 | 0 | 0 |
|  | Eugenol | 0 | 0 | 0 | 0 | 0 |
|  | 2-Methoxy-4-vinylphenol | 0 | 0 | 0 | 0 | 0 |
|  | 5-Octalactone | 0 | 0 | 0 | 0 | 0 |
|  | 5-Decalactone | 0 | 0 | 0 | 0 | 0 |
|  | 5-Octalactone + 5-decalactone | 0 | 0 | 0 | 0 | 0 |
| Evaluation | Meaty flavor | 4 | 4 | 5 | 5 | 4 |
|  | Grilled flavor | 4 | 3 | 3 | 3 | 5 |
|  | Sweet flavor | 7 | 2 | 2 | 2 | 3 |

TABLE 2

|  |  | Example | | | | | | |
|---|---|---|---|---|---|---|---|---|
|  |  | 13 | 14 | 15 | 16 | 17 | 18 | 19 |
| Oil and/or fat Content in oil and/or fat composition (ppm) | Rapeseed oil | 100 | 100 | 100 | 100 | 100 | 100 | 100 |
|  | Sulfurol | 2500 | 2500 | 2500 | 2500 | 2500 | 2500 | 2500 |
|  | 2,6-Dimethoxyphenol | 5000 | 5000 | 5000 | 5000 | 5000 | 5000 | 5000 |
|  | 3-Methylbutanal | 23 | 113 | 450 | 1125 | 113 | 113 | 113 |
|  | 4-Allyl-2,6-dimethoxyphenol | 0 | 0 | 0 | 0 | 23 | 225 | 1125 |
|  | Eugenol | 0 | 0 | 0 | 0 | 0 | 0 | 0 |
|  | 7-Methoxy-4-vinylphenol | 0 | 0 | 0 | 0 | 0 | 0 | 0 |
|  | 5-Octalactone | 0 | 0 | 0 | 0 | 0 | 0 | 0 |
|  | 5-Decalactone | 0 | 0 | 0 | 0 | 0 | 0 | 0 |
| Mass ratio to sulfurol | 2,6-Dimethoxyphenol | 2.0 | 2.0 | 2.0 | 2.0 | 2.0 | 2.0 | 2.0 |
|  | 3-Methylbutanal | 0.0092 | 0.045 | 0.18 | 0.45 | 0.045 | 0.045 | 0.045 |
|  | 4-Allyl-2,6-dimethoxyphenol | 0 | 0 | 0 | 0 | 0.0092 | 0.090 | 0.45 |

TABLE 2-continued

|  |  |  |  |  |  |  |  |  |
|---|---|---|---|---|---|---|---|---|
|  | Eugenol | 0 | 0 | 0 | 0 | 0 | 0 | 0 |
|  | 2-Methoxy-4-vinylphenol | 0 | 0 | 0 | 0 | 0 | 0 | 0 |
|  | 5-Octalactone | 0 | 0 | 0 | 0 | 0 | 0 | 0 |
|  | 5-Decalactone | 0 | 0 | 0 | 0 | 0 | 0 | 0 |
|  | 5-Octalactone + 5-decalactone | 0 | 0 | 0 | 0 | 0 | 0 | 0 |
| Mass ratio to 2,6-dimethoxyphenol | 3-Methylbutanal | 0.0046 | 0.023 | 0.090 | 0.22 | 0.023 | 0.023 | 0.023 |
|  | 4-Allyl-2,6-dimethoxyphenol | 0 | 0 | 0 | 0 | 0.0046 | 0.045 | 0.22 |
|  | Eugenol | 0 | 0 | 0 | 0 | 0 | 0 | 0 |
|  | 2-Methoxy-4-vinylphenol | 0 | 0 | 0 | 0 | 0 | 0 | 0 |
|  | 5-Octalactone | 0 | 0 | 0 | 0 | 0 | 0 | 0 |
|  | 5-Decalactone | 0 | 0 | 0 | 0 | 0 | 0 | 0 |
|  | 5-Octalactone + 5-decalactone | 0 | 0 | 0 | 0 | 0 | 0 | 0 |
| Evaluation | Meaty flavor | 4 | 4 | 4 | 3 | 5 | 6 | 6 |
|  | Grilled flavor | 6 | 6 | 6 | 7 | 6 | 6 | 6 |
|  | Sweet flavor | 4 | 4 | 4 | 3 | 4 | 5 | 5 |

|  |  |  | Example | | | | |
|---|---|---|---|---|---|---|---|
|  |  |  | 20 | 21 | 22 | 23 | 24 |
| Oil and/or fat Content in oil and/or fat composition (ppm) | Oil and/or fat | Rapeseed oil | 100 | 100 | 100 | 100 | 100 |
|  | Sulfurol |  | 2500 | 2500 | 2500 | 2500 | 2500 |
|  | 2,6-Dimethoxyphenol |  | 5000 | 5000 | 5000 | 5000 | 5000 |
|  | 3-Methylbutanal |  | 113 | 113 | 113 | 113 | 113 |
|  | 4-Allyl-2,6-dimethoxyphenol |  | 4500 | 11250 | 1125 | 1125 | 1125 |
|  | Eugenol |  | 0 | 0 | 11 | 113 | 563 |
|  | 7-Methoxy-4-vinylphenol |  | 0 | 0 | 0 | 0 | 0 |
|  | 5-Octalactone |  | 0 | 0 | 0 | 0 | 0 |
|  | 5-Decalactone |  | 0 | 0 | 0 | 0 | 0 |
| Mass ratio to sulfurol | 2,6-Dimethoxyphenol |  | 2.0 | 2.0 | 2.0 | 2.0 | 2.0 |
|  | 3-Methylbutanal |  | 0.045 | 0.045 | 0.045 | 0.045 | 0.045 |
|  | 4-Allyl-2,6-dimethoxyphenol |  | 1.8 | 4.5 | 0.45 | 0.45 | 0.45 |
|  | Eugenol |  | 0 | 0 | 0.0044 | 0.045 | 0.23 |
|  | 2-Methoxy-4-vinylphenol |  | 0 | 0 | 0 | 0 | 0 |
|  | 5-Octalactone |  | 0 | 0 | 0 | 0 | 0 |
|  | 5-Decalactone |  | 0 | 0 | 0 | 0 | 0 |
|  | 5-Octalactone + 5-decalactone |  | 0 | 0 | 0 | 0 | 0 |
| Mass ratio to 2,6-dimethoxyphenol | 3-Methylbutanal |  | 0.023 | 0.023 | 0.023 | 0.023 | 0.023 |
|  | 4-Allyl-2,6-dimethoxyphenol |  | 0.90 | 2.7 | 0.22 | 0.22 | 0.22 |
|  | Eugenol |  | 0 | 0 | 0.0022 | 0.023 | 0.11 |
|  | 2-Methoxy-4-vinylphenol |  | 0 | 0 | 0 | 0 | 0 |
|  | 5-Octalactone |  | 0 | 0 | 0 | 0 | 0 |
|  | 5-Decalactone |  | 0 | 0 | 0 | 0 | 0 |
|  | 5-Octalactone + 5-decalactone |  | 0 | 0 | 0 | 0 | 0 |
| Evaluation | Meaty flavor |  | 6 | 6 | 7 | 8 | 8 |
|  | Grilled flavor |  | 6 | 5 | 6 | 6 | 6 |
|  | Sweet flavor |  | 5 | 4 | 5 | 5 | 5 |

TABLE 3

|  |  | Example | | | | | | |
|---|---|---|---|---|---|---|---|---|
|  |  | 25 | 26 | 27 | 28 | 29 | 30 | 31 |
| Oil and/or fat Content in oil and/or fat composition (ppm) | Rapeseed oil | 100 | 100 | 100 | 100 | 100 | 100 | 100 |
|  | Sulfurol | 2500 | 2500 | 2500 | 2500 | 2500 | 2500 | 2500 |
|  | 2,6-Dimethoxyphenol | 5000 | 5000 | 5000 | 5000 | 5000 | 5000 | 3000 |
|  | 3-Methylbutanal | 113 | 113 | 113 | 113 | 113 | 113 | 113 |
|  | 4-Allyl-2,6-dimethoxyphenol | 1125 | 1125 | 1125 | 1125 | 1125 | 1125 | 1125 |
|  | Eugenol | 2250 | 5625 | 563 | 563 | 563 | 563 | 563 |
|  | 7-Methoxy-4-vinylphenol | 0 | 0 | 38 | 375 | 1875 | 7500 | 18750 |

TABLE 3-continued

|  |  |  |  |  |  |  |  |  |
|---|---|---|---|---|---|---|---|---|
|  | 5-Octalactone | 0 | 0 | 0 | 0 | 0 | 0 | 0 |
|  | 5-Decalactone | 0 | 0 | 0 | 0 | 0 | 0 | 0 |
| Mass ratio to sulfurol | 2,6-Dimethoxyphenol | 2.0 | 2.0 | 2.0 | 2.0 | 2.0 | 2.0 | 2.0 |
|  | 3-Methylbutanal | 0.045 | 0.045 | 0.045 | 0.045 | 0.045 | 0.045 | 0.045 |
|  | 4-Allyl-2,6-dimethoxyphenol | 0.45 | 0.45 | 0.45 | 0.45 | 0.45 | 0.45 | 0.45 |
|  | Eugenol | 0.90 | 2.3 | 0.23 | 0.23 | 0.23 | 0.23 | 0.23 |
|  | 2-Methoxy-4-vinylphenol | 0 | 0 | 0.015 | 0.15 | 0.75 | 3.0 | 7.5 |
|  | 5-Octalactone | 0 | 0 | 0 | 0 | 0 | 0 | 0 |
|  | 5-Decalactone | 0 | 0 | 0 | 0 | 0 | 0 | 0 |
|  | 5-Octalactone + 5-decalactone | 0 | 0 | 0 | 0 | 0 | 0 | 0 |
| Mass ratio to 2,6-dimethoxyphenol | 3-Methylbutanal | 0.023 | 0.023 | 0.023 | 0.023 | 0.023 | 0.023 | 0.023 |
|  | 4-Allyl-2,6-dimethoxyphenol | 0.22 | 0.22 | 0.22 | 0.22 | 0.22 | 0.22 | 0.22 |
|  | Eugenol | 0.05 | 1.12 | 0.11 | 0.11 | 0.11 | 0.11 | 0.11 |
|  | 2-Methoxy-4-vinylphenol | 0 | 0 | 0.0076 | 0.075 | 0.37 | 1.5 | 3.7 |
|  | 5-Octalactone | 0 | 0 | 0 | 0 | 0 | 0 | 0 |
|  | 5-Decalactone | 0 | 0 | 0 | 0 | 0 | 0 | 0 |
|  | 5-Octalactone + 5-decalactone | 0 | 0 | 0 | 0 | 0 | 0 | 0 |
| Evaluation | Meaty flavor | 8 | 7 | 8 | 9 | 9 | 9 | 7 |
|  | Grilled flavor | 6 | 6 | 7 | 8 | 8 | 8 | 9 |
|  | Sweet flavor | 5 | 4 | 5 | 5 | 5 | 5 | 4 |

|  |  |  | Example |  |  |  |  |
|---|---|---|---|---|---|---|---|
|  |  |  | 32 | 33 | 34 | 35 | 36 |
| Oil and/or fat Content in oil and/or fat composition (ppm) | Oil and/or fat | Rapeseed oil | 100 | 100 | 100 | 100 | 100 |
|  |  | Sulfurol | 2500 | 2500 | 2500 | 625 | 125 |
|  |  | 2,6-Dimethoxyphenol | 5000 | 5000 | 5000 | 1250 | 250 |
|  |  | 3-Methylbutanal | 113 | 113 | 113 | 28 | 6.6 |
|  |  | 4-Allyl-2,6-dimethoxyphenol | 1125 | 1125 | 1125 | 261 | 58 |
|  |  | Eugenol | 563 | 563 | 563 | 141 | 28 |
|  |  | 7-Methoxy-4-vinylphenol | 1875 | 1875 | 1875 | 469 | 94 |
|  |  | 5-Octalactone | 0.38 | 3.8 | 19 | 4.7 | 0.94 |
|  |  | 5-Decalactone | 1.1 | 11 | 56 | 24 | 2.8 |
| Mass ratio to sulfurol | 2,6-Dimethoxyphenol |  | 2.0 | 2.0 | 2.0 | 2.0 | 2.0 |
|  | 3-Methylbutanal |  | 0.045 | 0.045 | 0.045 | 0.045 | 0.045 |
|  | 4-Allyl-2,6-dimethoxyphenol |  | 0.45 | 0.45 | 0.45 | 0.45 | 0.45 |
|  | Eugenol |  | 0.23 | 0.23 | 0.23 | 0.23 | 0.22 |
|  | 2-Methoxy-4-vinylphenol |  | 0.75 | 0.75 | 0.75 | 0.75 | 0.75 |
|  | 5-Octalactone |  | 0.00015 | 0.0015 | 0.0076 | 0.0075 | 0.0075 |
|  | 5-Decalactone |  | 0.00044 | 0.0044 | 0.022 | 0.022 | 0.022 |
|  | 5-Octalactone + 5-decalactone |  | 0.00059 | 0.0059 | 0.030 | 0.030 | 0.030 |
| Mass ratio to 2,6-dimethoxyphenol | 3-Methylbutanal |  | 0.023 | 0.023 | 0.023 | 0.022 | 0.022 |
|  | 4-Allyl-2,6-dimethoxyphenol |  | 0.22 | 0.22 | 0.22 | 0.22 | 0.22 |
|  | Eugenol |  | 0.11 | 0.11 | 0.11 | 0.11 | 0.11 |
|  | 2-Methoxy-4-vinylphenol |  | 0.37 | 0.37 | 0.37 | 0.38 | 0.38 |
|  | 5-Octalactone |  | 0 | 0.00076 | 0.0038 | 0.0038 | 0.0038 |
|  | 5-Decalactone |  | 0 | 0.0022 | 0.011 | 0.011 | 0.011 |
|  | 5-Octalactone + 5-decalactone |  | 0 | 0.0030 | 0.015 | 0.015 | 0.015 |
| Evaluation | Meaty flavor |  | 9 | 10 | 10 | 20 | 10 |
|  | Grilled flavor |  | 8 | 8 | 8 | 8 | 8 |
|  | Sweet flavor |  | 6 | 7 | 8 | 8 | 8 |

TABLE 4

|  |  |  | Example |  |  |  |  |
|---|---|---|---|---|---|---|---|
|  |  |  | 37 | 38 | 39 | 40 | 41 |
| Oil and/or fat Content in oil and/or fat | Oil and/or fat | Rapeseed oil | 100 | 100 | 100 | 100 | 100 |
|  |  | Sulfurol | 42 | 14 | 2500 | 2500 | 2500 |
|  |  | 2,6-Dimethoxyphenol | 84 | 28 | 5000 | 5000 | 5000 |

TABLE 4-continued

|  |  |  |  |  |  |  |
|---|---|---|---|---|---|---|
| composition (ppm) | 3-Methylbutanal | 1.9 | 0.6 | 113 | 113 | 123 |
|  | 4-Allyl-2,6-dimethoxyphenol | 19 | 6.3 | 1125 | 1125 | 1125 |
|  | Eugenol | 9.4 | 3.1 | 563 | 563 | 563 |
|  | 2-Methoxy-4-vinylphenol | 31 | 10 | 1875 | 1875 | 1875 |
|  | 5-Octalactone | 0.31 | 0.10 | 75 | 188 | 75 |
|  | 5-Decalactone | 0.94 | 0.31 | 225 | 563 | 0 |
| Mass ratio to sulfurol | 2,6-Dimethoxyphenol | 2.0 | 2.0 | 2.0 | 2.0 | 2.0 |
|  | 3-Methylbutanal | 0.045 | 0.045 | 0.045 | 0.045 | 0.045 |
|  | 4-Allyl-2,6-dimethoxyphenol | 0.45 | 0.45 | 0.45 | 0.45 | 0.45 |
|  | Eugenol | 0.22 | 0.22 | 0.23 | 0.23 | 0.23 |
|  | 2-Methoxy-4-vinylphenol | 0.74 | 0.71 | 0.75 | 0.75 | 0.75 |
|  | 5-Octalactone | 0.0074 | 0.0071 | 0.030 | 0.075 | 0.030 |
|  | 5-Decalactone | 0.022 | 0.022 | 0.090 | 0.23 | 0 |
|  | 5-Octalactone + 5-decalactone | 0.030 | 0.029 | 0.12 | 0.30 | 0.030 |
| Mass ratio to 2,6-dimethoxyphenol | 3-Methylbutanal | 0.023 | 0.023 | 0.023 | 0.023 | 0.023 |
|  | 4-Allyl-2,6-dimethoxyphenol | 0.23 | 0.23 | 0.22 | 0.22 | 0.22 |
|  | Eugenol | 0.11 | 0.11 | 0.11 | 0.11 | 0.11 |
|  | 2-Methoxy-4-vinylphenol | 0.37 | 0.36 | 0.37 | 0.37 | 0.37 |
|  | 5-Octalactone | 0.0037 | 0.0036 | 0.015 | 0.038 | 0.015 |
|  | 5-Decalactone | 0.011 | 0.011 | 0.045 | 0.11 | 0 |
|  | 5-Octalactone + 5-decalactone | 0.015 | 0.015 | 0.060 | 0.15 | 0.015 |
| Evaluation | Meaty flavor | 9 | 8 | 9 | 8 | 10 |
|  | Grilled flavor | 7 | 6 | 7 | 6 | 8 |
|  | Sweet flavor | 7 | 6 | 9 | 10 | 8 |

|  |  | Example | Comparative Example |  |  |  |  |  |
|---|---|---|---|---|---|---|---|---|
|  |  | 42 | 1 | 2 | 3 | 4 | 5 | 6 |
| Oil and/or fat Content in oil and/or fat composition (ppm) | Rapeseed oil | 100 | 100 | 100 | 100 | 100 | 100 | 100 |
|  | Sulfurol | 2500 | 0 | 7500 | 0 | 0 | 0 | 0 |
|  | 2,6-Dimethoxyphenol | 5000 | 0 | 0 | 7500 | 0 | 0 | 0 |
|  | 3-Methylbutanal | 113 | 0 | 0 | 0 | 113 | 0 | 0 |
|  | 4-Allyl-2,6-dimethoxyphenol | 1125 | 0 | 0 | 0 | 0 | 1125 | 0 |
|  | Eugenol | 561 | 0 | 0 | 0 | 0 | 0 | 563 |
|  | 2-Methoxy-4-vinylphenol | 1875 | 0 | 0 | 0 | 0 | 0 | 0 |
|  | 5-Octalactone | 0 | 0 | 0 | 0 | 0 | 0 | 0 |
|  | 5-Decalactone | 73 | 0 | 0 | 0 | 0 | 0 | 0 |
| Mass ratio to sulfurol | 2,6-Dimethoxyphenol | 2.0 | — | — | — | — | — | — |
|  | 3-Methylbutanal | 0.045 | — | 0 | — | — | — | — |
|  | 4-Allyl-2,6-dimethoxyphenol | 0.45 | — | 0 | — | — | — | — |
|  | Eugenol | 0.23 | — | 0 | — | — | — | — |
|  | 2-Methoxy-4-vinylphenol | 0.75 | — | 0 | — | — | — | — |
|  | 5-Octalactone | 0 | — | 0 | — | — | — | — |
|  | 5-Decalactone | 0.030 | — | 0 | — | — | — | — |
|  | 5-Octalactone + 5-decalactone | 0.070 | — | 0 | — | — | — | — |
| Mass ratio to 2,6-dimethoxyphenol | 3-Methylbutanal | 0.023 | — | — | 0 | — | — | — |
|  | 4-Allyl-2,6-dimethoxyphenol | 0.22 | — | — | 0 | — | — | — |
|  | Eugenol | 0.11 | — | — | 0 | — | — | — |
|  | 2-Methoxy-4-vinylphenol | 0.37 | — | — | 0 | — | — | — |
|  | 5-Octalactone | 0 | — | — | 0 | — | — | — |
|  | 5-Decalactone | 0.015 | — | — | 0 | — | — | — |
|  | 5-Octalactone + 5-decalactone | 0.015 | — | — | 0 | — | — | — |
| Evaluation | Meaty flavor | 10 | 1 | 4 | 1 | 2 | 3 | 3 |
|  | Grilled flavor | 8 | 1 | 1 | 3 | 2 | 2 | 1 |
|  | Sweet flavor | 8 | 1 | 2 | 2 | 3 | 3 | 1 |

TABLE 5

|  |  | Comparative Example | | | | | | |
|---|---|---|---|---|---|---|---|---|
|  |  | 7 | 8 | 9 | 10 | 11 | 12 | 13 |
| Oil and/or fat | Rapeseed oil | 100 | 100 | 100 | 100 | 100 | 100 | 100 |
| Content in | Sulfurol | 0 | 0 | 7500 | 7500 | 7500 | 7500 | 7500 |
| oil and/or fat | 2,6-Dimethoxyphenol | 0 | 0 | 0 | 0 | 0 | 0 | 0 |
| composition | 3-Methylbutanal | 0 | 0 | 113 | 0 | 0 | 0 | 0 |
| (ppm) | 4-Allyl-2,6-dimethoxyphenol | 0 | 0 | 0 | 1125 | 0 | 0 | 0 |
|  | Eugenol | 0 | 0 | 0 | 0 | 563 | 0 | 0 |
|  | 2-Methoxy-4-vinylphenol | 1875 | 0 | 0 | 0 | 0 | 1875 | 0 |
|  | 5-Octalactone | 0 | 19 | 0 | 0 | 0 | 0 | 19 |
|  | 5-Decalactone | 0 | 56 | 0 | 0 | 0 | 0 | 55 |
| Mass ratio | 2,6-Dimethoxyphenol | — | — | 0 | 0 | 0 | 0 | 0 |
| to sulfurol | 3-Methylbutanal | — | — | 0.015 | 0 | 0 | 0 | 0 |
|  | 4-Allyl-2,6-dimethoxyphenol | — | — | 0 | 0.15 | 0 | 0 | 0 |
|  | Eugenol | — | — | 0 | 0 | 0.075 | 0 | 0 |
|  | 2-Methoxy-4-vinylphenol | — | — | 0 | 0 | 0 | 0.25 | 0 |
|  | 5-Octalactone | — | — | 0 | 0 | 0 | 0 | 0.0025 |
|  | 5-Decalactone | — | — | 0 | 0 | 0 | 0 | 0.0075 |
|  | 5-Octalactone + 5-decalactone | — | — | 0 | 0 | 0 | 0 | 0.010 |
| Mass ratio | 3-Methylbutanal | — | — | — | — | — | — | — |
| to 2,6-dimethoxyphenol | 4-Allyl-2,6-dimethoxyphenol | — | — | — | — | — | — | — |
|  | Eugenol | — | — | — | — | — | — | — |
|  | 2-Methoxy-4-vinylphenol | — | — | — | — | — | — | — |
|  | 5-Octalactone | — | — | — | — | — | — | — |
|  | 5-Decalactone | — | — | — | — | — | — | — |
|  | 5-Octalactone + 5-decalactone | — | — | — | — | — | — | — |
| Evaluation | Meaty flavor | 2 | 1 | 4 | 4 | 5 | 4 | 4 |
|  | Grilled flavor | 4 | 1 | 2 | 2 | 2 | 2 | 1 |
|  | Sweet flavor | 1 | 7 | 3 | 2 | 1 | 1 | 7 |

|  |  | Comparative Example | | | | |
|---|---|---|---|---|---|---|
|  |  | 14 | 15 | 16 | 17 | 18 |
| Oil and/or fat | Rapeseed oil | 100 | 100 | 100 | 100 | 100 |
| Content in | Sulfurol | 0 | 0 | 0 | 0 | 0 |
| oil and/or fat | 2,6-Dimethoxyphenol | 7500 | 1500 | 7500 | 7300 | 7500 |
| composition | 3-Methylbutanal | 113 | 0 | 0 | 0 | 0 |
| (ppm) | 4-Allyl-2,6-dimethoxyphenol | 0 | 1125 | 0 | 0 | 0 |
|  | Eugenol | 0 | 0 | 563 | 0 | 0 |
|  | 2-Methoxy-4-vinylphenol | 0 | 0 | 0 | 1875 | 0 |
|  | 5-Octalactone | 0 | 0 | 0 | 0 | 19 |
|  | 5-Decalactone | 0 | 0 | 0 | 0 | 56 |
| Mass ratio | 2,6-Dimethoxyphenol | — | — | — | — | — |
| to sulfurol | 3-Methylbutanal | — | — | — | — | — |
|  | 4-Allyl-2,6-dimethoxyphenol | — | — | — | — | — |
|  | Eugenol | — | — | — | — | — |
|  | 2-Methoxy-4-vinylphenol | — | — | — | — | — |
|  | 5-Octalactone | — | — | — | — | — |
|  | 5-Decalactone | — | — | — | — | — |
|  | 5-Octalactone + 5-decalactone | — | — | — | — | — |
| Mass ratio | 3-Methylbutanal | 0.015 | 0 | 0 | 0 | 0 |
| to 2,6-dimethoxyphenol | 4-Allyl-2,6-dimethoxyphenol | 0 | 0.15 | 0 | 0 | 0 |
|  | Eugenol | 0 | 0 | 0.075 | 0 | 0 |
|  | 2-Methoxy-4-vinylphenol | 0 | 0 | 0 | 0.25 | 0 |
|  | 5-Octalactone | 0 | 0 | 0 | 0 | 0.0025 |
|  | 5-Decalactone | 0 | 0 | 0 | 0 | 0.0075 |
|  | 5-Octalactone + 5-decalactone | 0 | 0 | 0 | 0 | 0.010 |
| Evaluation | Meaty flavor | 1 | 2 | 2 | 2 | 1 |
|  | Grilled flavor | 4 | 4 | 4 | 5 | 3 |
|  | Sweet flavor | 3 | 2 | 1 | 1 | 7 |

As shown in Tables 1 to 5, the oil and/or fat compositions containing sulfurol and 2,6-dimethoxyphenol had a good meaty flavor and a good grilled flavor.

As the sulfurol content increased, the meaty flavor tended to become better.

As the 2,6-dimethoxyphenol content increased, the grilled flavor tended to become better.

As the 3-methylbutanal content increased, the meaty flavor and the grilled flavor tended to become better, and the sweet flavor tended to become better.

As the 4-allyl-2,6-dimethoxyphenol content increased, the meaty flavor tended to become better, and the sweet flavor tended to become better.

As the eugenol content increased, the meaty flavor tended to become much better.

As the 2-methoxy-4-vinylphenol content increased, the meaty flavor and the grilled flavor tended to become much better.

As the content of δ-octalactone and/or δ-decalactone increased, the meaty flavor tended to become better, and the sweet flavor tended to become better.

<Experiment 2: Preparation of Soy Hamburger Patties>

Soy hamburger patties (corresponding to meat alternative food products) were prepared using each of the oil and/or fat compositions of the examples prepared in Experiment 1 shown above. The soy hamburger patties were made mainly from dried defatted soybean granules and dried defatted soybean powder and were free of any animal-derived ingredient. Each of the soy hamburger patties contained about 20% by mass of one of the oil and/or fat compositions based on the total mass of the materials used to form the patty.

The resulting soy hamburger patties containing the oil and/or fat compositions of the examples had a good meaty flavor, a grilled flavor, and a good sweet flavor, which were similar to the results of Experiment 1. The soy hamburger patties containing the oil and/or fat compositions of the examples had their beany flavor masked to provide improved palatability.

The invention claimed is:

1. An oil and/or fat composition comprising: an oil and/or fat; sulfurol in an amount of 14-2,500 ppm; 2,6-dimethoxyphenol in an amount of 28-5,000 ppm; 3-methylbutanal in an amount of 0.6-123 ppm; and 4-allyl-2,6-dimethoxyphenol in an amount of 6.3-1,125 ppm.

2. The oil and/or fat composition according to claim 1, further comprising eugenol.

3. The oil and/or fat composition according to claim 2, further comprising 2-methoxy-4-vinylphenol, wherein:
   the amount of the 3-methylbutanal is 0.6-113 ppm,
   an amount of the eugenol is 3.1-563 ppm, and
   an amount of the 2-methoxy-4-vinylphenol is 10-18,750 ppm.

4. The oil and/or fat composition according to claim 3, further comprising δ-octalactone in an amount from 0.10 to 188 ppm.

5. The oil and/or fat composition according to claim 4, further comprising δ-decalactone in an amount from 0.31 to 563 ppm.

6. The oil and/or fat composition according to claim 3, further comprising δ-decalactone in an amount from 0.31 to 563 ppm.

7. The oil and/or fat composition according to claim 3, wherein:
   the amount of the sulfurol is 42-2500 ppm,
   the amount of the 3-methylbutanal is 1.9-113 ppm,
   the amount of the 4-allyl-2,6-dimethoxyphenol is 19-1125 ppm,
   the amount of the eugenol is 9.4-563 ppm, and
   the amount of the 2-methoxy-4-vinylphenol is 31-7500 ppm.

8. The oil and/or fat composition according to claim 7, further comprising δ-octalactone in an amount from 0.31 to 188 ppm.

9. The oil and/or fat composition according to claim 7, further comprising δ-decalactone in an amount from 0.94 to 563 ppm.

10. The oil and/or fat composition according to claim 2, wherein a mass ratio of eugenol to the sulfurol is 0.0044-2.3.

11. The oil and/or fat composition according to claim 1, further comprising 2-methoxy-4-vinylphenol.

12. The oil and/or fat composition according to claim 11, wherein an amount of the 2-methoxy-4-vinylphenol is 38 to 18,750 ppm.

13. The oil and/or fat composition according to claim 12, wherein an amount of the 2-methoxy-4-vinylphenol is 375 to 7500 ppm.

14. The oil and/or fat composition according to claim 11, wherein a mass ratio of the 2-methoxy-4-vinylphenol to the sulfurol is 0.015-7.5.

15. The oil and/or fat composition according to claim 1, further comprising δ-octalactone and/or δ-decalactone.

16. A food or beverage product comprising the oil and/or fat composition according to claim 1.

17. The oil and/or fat composition according to claim 1, wherein a mass ratio of the 4-allyl-2,6-dimethoxyphenol to the sulfurol is 0.0092-4.5.

18. The oil and/or fat composition according to claim 1, wherein a mass ratio of the 2,6-dimethoxyphenol to the sulfurol is 0.11-9.

19. The oil and/or fat composition according to claim 1, wherein a mass ratio of the 3-methylbutanal to the sulfurol is 0.00092-0.45.

* * * * *